US007152147B2

(12) United States Patent
Suzuki (10) Patent No.: US 7,152,147 B2
(45) Date of Patent: Dec. 19, 2006

(54) STORAGE CONTROL SYSTEM AND STORAGE CONTROL METHOD (75) Inventor: Takashi Suzuki, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 17 days.

(21) Appl. No.: 10/918,719

(22) Filed: Aug. 13, 2004

(65) Prior Publication Data
US 2005/0289309 A1    Dec. 29, 2005

(30) Foreign Application Priority Data
Jun. 25, 2004  (JP)  ............... 2004-187905

(51) Int. Cl.
G06F 12/16 (2006.01)
(52) U.S. Cl. .............. 711/162; 707/202; 707/204; 707/206; 711/114; 711/154; 711/170; 711/202; 711/214
(58) Field of Classification Search ............... 707/200, 707/202, 204, 206; 711/100, 103, 114, 154, 711/162, 170, 202, 214
See application file for complete search history.

(56) References Cited

U.S. PATENT DOCUMENTS

| 5,553,279 | A | * | 9/1996 | Goldring ............... 707/201 |
| 5,742,792 | A | * | 4/1998 | Yanai et al. ............ 711/162 |
| 6,044,444 | A | * | 3/2000 | Ofek ...................... 711/162 |
| 6,081,875 | A | * | 6/2000 | Clifton et al. ......... 711/162 |
| 6,311,193 | B1 | * | 10/2001 | Sekido ................... 707/202 |
| 6,321,239 | B1 | * | 11/2001 | Shackelford .......... 707/206 |
| 6,473,775 | B1 | * | 10/2002 | Kusters et al. ........ 707/200 |
| 6,594,744 | B1 | | 7/2003 | Humlicek et al. |
| 6,631,478 | B1 | * | 10/2003 | Wang et al. ............. 714/15 |
| 2003/0177306 | A1 | * | 9/2003 | Cochran et al. ....... 711/114 |
| 2004/0167943 | A1 | | 8/2004 | Margolus |
| 2004/0186900 | A1 | | 9/2004 | Nakano et al. |
| 2004/0210608 | A1 | | 10/2004 | Lee et al. |

FOREIGN PATENT DOCUMENTS

JP    2001-216185 A    8/2001

OTHER PUBLICATIONS

Microsoft Computer Dictionary, 5th Edition, 2002, p. 427.*

* cited by examiner

Primary Examiner—Matthew Kim
Assistant Examiner—Chase Peers
(74) Attorney, Agent, or Firm—Townsend and Townsend and Crew LLP

(57) ABSTRACT

A computer system comprises a primary volume 22P having a plurality of storage blocks P, and a differential volume 22D having a plurality of storage blocks D. Differential data corresponding to one among the plurality of storage blocks P is stored in at least one among the plurality of storage blocks D. A control device 210 identifies differential data which is unnecessary for a host device 100, based on a snapshot management table S or C indicating whether data has been read by the host device 100 from any one of storage blocks P, and on a differential management table 400 indicating to which storage block P differential data corresponds and in which storage block D the data is stored, and performs at least one among removal of the identified differential data from the differential volume 22D, and removal of an unnecessary information element from the differential management table 400.

5 Claims, 7 Drawing Sheets

DIFFERENTIAL MANAGEMENT TABLE

|    | x1 | x2 | x3 | x4 | ------ |
|----|----|----|----|----|--------|
| y1 | a  | b  | c  |    |        |
| y2 |    | d  | e  |    |        |
| y3 | f  |    |    | g  | ------ |
| y4 | h  | i  | j  |    | ~TB1   |

| | |
|---|---|
| SUPERBLOCK | ~900 |
| BLOCK GROUP DESCRIPTOR | ~910 |
| DATA BLOCK BITMAP | ~920 |
| i NODE BITMAP | ~930 |
| i NODE TABLE | ~940 |
| DATA BLOCK | ~950 |
| | ~25P |

SNAPSHOT MANAGEMENT TABLE

|    | m1 | m2 | m3 | m4 | ------ |
|----|----|----|----|----|--------|
| n1 | 0  | 1  | 0  | 1  |        |
| n2 | 1  | 1  | 0  | 1  | ------ S (AND C) |
| n3 | 1  | 0  | 1  | 0  |        |
| n4 | 0  | 0  | 1  | 1  | TB2    |

STORAGE CONTROL SYSTEM AND STORAGE CONTROL METHOD

CROSS-REFERENCE TO PRIOR APPLICATION

This application relates to and claims priority from Japanese Patent Application No. 2004-187905, filed on Jun. 25, 2004, the entire disclosure of which is incorporated herein by reference.

BACKGROUND OF THE INVENTION

1. Field of the Invention

This invention relates to a storage control system and storage control method.

2. Description of the Related Art

Storage control systems such as RAID (Redundant Array of Independent Inexpensive Disks) system are known which comprise a plurality of physical data storage devices (for example, hard disk drives) arranged in an array. In a plurality of storage devices comprised by such a storage control system, one or a plurality of logical volumes, which are logical storage devices, are prepared. A storage control system is generally connected to a host device. Such a storage control system receives write requests from the host device and writes data received from the host device to a logical volume according to the write request, or receives read requests from the host device and transmits to the host device data read from a logical volume according to the read request.

In a computer system comprising a storage control system and a host device, when for example the data stored in the storage control system is backed up, a copy of a logical volume in which the original data is stored may be generated. In the generation of a copy volume in such cases, a technique employing "snapshots" is known, in which updated differential data is copied and stored within the storage control system, with the goals of both reducing the storage area employed for copying for cost reasons, and of shortening the time required when restoring an updated volume from a copy volume from the standpoint of improving restore operations. That is, such a storage control system may create a snapshot of a logical volume in order to manage the data configuration within the logical volume at a certain time (see for example Japanese Patent Laid-open No. 2001-216185).

There may be for example two types of logical volume, which are primary volumes and secondary volumes. Primary volumes and secondary volumes may be mutually associated (for example, put into a paired state). In snapshot-creation, for example, when the storage control system receives new data (hereafter called "update data") from the host device and writes the data to a logical volume, the update data itself, or the original data which has been overwritten with update data, is written to a specific secondary volume (hereafter for convenience called a "differential volume") as differential data. In taking a snapshot using such a method, each time update data is overwritten, the differential data is accumulated in the differential volume as an update history (or, old differential data may be overwritten by new differential data, and therefore lost). Consequently, from the start of creation of the snapshot until the snapshot is canceled (in other words, until all the differential data is discarded), the differential data is retained.

On the other hand, there are cases in which the host device may use the file system of the primary volume to manage data in the primary volume; in such cases, when for example discarding data in the primary volume, only changes to the file system are executed by the host device, and in the storage control system only the corresponding data in the file system is discarded. Consequently data which has become unnecessary for the host device may remain as differential data within the differential volume of the storage control system. Such cases are not limited to data discarding as described above, but can also occur upon data updates (for example, when updating large-size data with small-size data).

SUMMARY OF THE INVENTION

Hence one object of the invention is to eliminate the need for the storage control system to manage data which has become unnecessary for the host device.

Other objects of the invention will become clear through the following explanation.

A storage control system according to this invention is a storage control system connected to an external device which performs data reading and writing, and comprises a first storage device having a plurality of first storage areas; a second storage device having a plurality of second storage areas; and a control device which controls the exchange of data between the above external device and at least one among the above first and second storage devices. At least one among the above plurality of second storage areas stores corresponding data corresponding to one among the above plurality of first storage areas. The above control device acquires read management information, indicating from which first storage area data has not been read by the external device. Further, the control device acquires correspondence management information indicating to which first storage area corresponding data corresponds and in which second storage area the data is stored (for example, the information is acquired from a prescribed storage region (for example, memory) within the storage control system). Further, based on the above acquired read management information and correspondence management information, the control device specifies in which second storage area corresponding data which is unnecessary for the above external device is stored and to which first storage area among the above plurality of first storage areas the second storage area corresponds. Also, the control device performs at least one among removal of the correspondence corresponding data stored in the above specified second storage area from the second storage area, and removal of the information element indicating the above specified second storage area in the above correspondence management information from the above correspondence management information.

At least one among the above first and second storage devices may for example be a physical storage device (such as for example memory or a hard disk), or may be a logical storage device (for example a logical volume) prepared for such a physical storage device.

Further, at least one among the above first storage areas and the above second storage areas may be, for example, sectors or tracks managed on a hard disk, or may be one or more logical groups on a logical volume.

Further, the control device can be a device comprising storage media (for example, memory) on which is stored, for example, a computer program, and a processor (for example, a CPU) which operates by reading the computer program. Further, the above-described processing performed by the control device may be performed by a processor which has read one or a plurality of computer programs.

The above corresponding data may for example be differential data, described in detail below.

The above read management information may be, for example, information indicating the presence or absence of data in each of the first storage areas, at the time at which the read management information is created. Specifically, the above read management information may for example be one, or both among the snapshot management table at the time of acquisition of a snapshot, described below, and the snapshot management table at the time of discarding of superfluous differential management discarding (for example, at the present time).

Further, the above correspondence management information may be information in which are recorded, for example, for each first storage area, the position of the first storage area and the position of the second storage area in which is stored corresponding data corresponding to the first storage area. Specifically, the above correspondence management information may for example be a differential management table, described in detail below.

Further, at least one among the above read management information and the above correspondence management information may be, for example, generated by one among, or by both of, the above external device and the above storage control system.

In a first aspect of the above storage control system, the above external device transmits data for writing to the above storage control system. Further, the destination for writing of the above data for writing a first storage area in which is stored free-data indicating that the area is free space. In this case, the above control device executes the following processing. For example, upon receiving data for writing from the above external device with a first timing, the control device selects a free second storage area from among the above plurality of second storage areas, writes to the above selected free second storage area the free-data of the first storage area which is to be the write destination of the data for writing received, and writes the above received data for writing to the first storage area which is the above write destination. The control device writes, to the above correspondence management information, an information element indicating which among the above plurality of second storage areas is the second storage area to which the above free-data has been written, and which corresponds to the first storage area in which the above free-data had been stored. Further, the control device acquires the above read management information with the above first timing, and from the above acquired read management information, specifies which among the above plurality of first storage areas is the first storage area in which the free-data had been stored at the above first timing. Also, if the above acquired correspondence management information comprises an information element indicating the second storage area associated with the first storage area in which the above free-data had been stored, the control device removes the above comprised information element from the above correspondence management information.

By the way, the "free-data" is all 0's or all 1's.

The first timing may for example be the time of acquisition of any snapshot after snapshot acquisition processing has begun. The above read management information at the first timing may for example be generated by either or both of the above external device and the above storage control system.

In a second aspect of the above storage control system, the above external device transmits data for writing to the above storage control system, and upon receiving data for writing from the above external device at a first timing, the above control device selects a free second storage area from among the above plurality of second storage areas, and writes the above received data for writing to the above selected free second storage area. The control device specifies in which first storage area among the above plurality of first storage areas exists the data corresponding to the above data for writing, and writes, to the above correspondence management information, an information element (for example, position information), indicating that the above specified first storage area corresponds to the second storage area to which was written the above data for writing. The control device acquires the above read management information for the above first timing, and specifies which first storage area among the above plurality of first storage areas was free at the time of the above first timing, using the above acquired read management information. Also, if an information element indicating the second storage area associated with the first storage area which had been free is comprised by the above acquired correspondence management information, the control device removes the above comprised information element from the above correspondence management information, and moreover removes the data for writing within the second storage area indicated by the above comprised information element from the above second storage area. In this case, the data for writing may be removed from the second storage area by copying to the first storage area corresponding to the second storage area.

In a third aspect of the above storage control system, the above external device transmits data for writing to the above storage control system, and moreover transmits data update requests (for example, requests to overwrite data files) or deletion requests (for example, requests to delete data files) to the above storage control system. When the above control device receives data for writing from the above external device with a first timing, the control device selects a free second storage area from among the above plurality of second storage areas, writes first data of the first storage area which becomes the write destination of the above data for writing to the above selected free second storage area, and moreover writes the above received data for writing to the first storage area which is the above write destination. The control device also writes, to the above correspondence management information, an information element indicating which second storage area among the above plurality of second storage areas is the second storage area to which the above first data has been written and corresponds to the first storage area in which the above first data had been stored. Further, when at a second timing following the above first timing the control device receives a data update request or deletion request from the above external device, the control device responds to the above received update request or deletion request, and erases the data which had been stored in the above first storage area. Also, the control device acquires the above read management information for a timing following the above second timing, and from the above acquired read management information specifies a free first storage area in which data is not stored among the above plurality of first storage areas. Further, if the above acquired correspondence management information comprises an information element indicating the second storage area associated with the above free first storage area, the above comprised information element is removed from the above correspondence management information, and moreover the data within the second storage area indicated by the above comprised information element is removed from the above second storage area.

The above first timing may for example be the point in time at which an instruction is issued to make a backup of data existing in the first storage area (specifically, may be any snapshot acquisition time after the beginning of processing to take the snapshot). Further, the above second timing may for example be the time at which the above control device erases data from at least one among the above plurality of first storage areas, due to a data update request or deletion request from the above external device. Further, the above timing following the second timing may for example be the time of superfluous differential management discarding, described below.

In a fourth aspect of the above storage control system, the above external device transmits data for writing to the above storage control system, and moreover transmits data update requests or deletion requests to the above storage control system. When the above control device receives data for writing from the above external device with a first timing, the control device selects a free second storage area from among the above plurality of second storage areas, and writes the above received data for writing to the above selected free second storage area. Also, the control device writes, to the above correspondence management information, an information element specifying the first storage area among the above plurality of first storage areas in which the data corresponding to the above data for writing exists, and indicating that the second storage area to which the above data for writing has been written corresponds to the above specified first storage area. Further, when at a timing following the above first timing, the control device receives a data update request or deletion request from the above external device, the control device erases the data stored in the above first storage area in response to the above received update request or deletion request. Also, the control device acquires the above read management information at a timing following the above second timing, and from the above acquired read management information specifies a first storage area in which data is not stored among the above plurality of first storage areas. Further, if the above acquired correspondence management information comprises an information element indicating the second storage area associated with the above free first storage area, the above comprised information element is removed from the above correspondence management information, and moreover data for writing in the second storage area indicated by the above comprised information element is removed from the above second storage area. In this case, the data for writing may be removed from the second storage area by copying to the first storage area corresponding to the second storage area.

A storage control method of this invention, in a storage control system comprising a first storage device having a plurality of first storage areas and a second storage device having a plurality of second storage areas, has a step of storing, in at least one among the above plurality of second storage areas, corresponding data which corresponds to one among the above plurality of first storage areas; a step of creating read management information indicating from which first storage area data has not been read by the above external device; a step of acquiring the above read management information; a step of acquiring correspondence management information indicating to which first storage area corresponding data corresponds and in which second storage area the data is stored; a step of specifying, based on the above acquired read management information and correspondence management information, in which second storage area corresponding data which is unnecessary for the above external device is stored and to which first storage area among the above plurality of first storage areas the second storage area corresponds; and, a step of discarding at least one among the corresponding data stored in the above specified second storage area, and information indicating the above specified second storage area in the above correspondence management information.

DESCRIPTION OF THE PREFERRED EMBODIMENTS

Below, an aspect of this invention is explained referring to the drawings.

Figure 1:
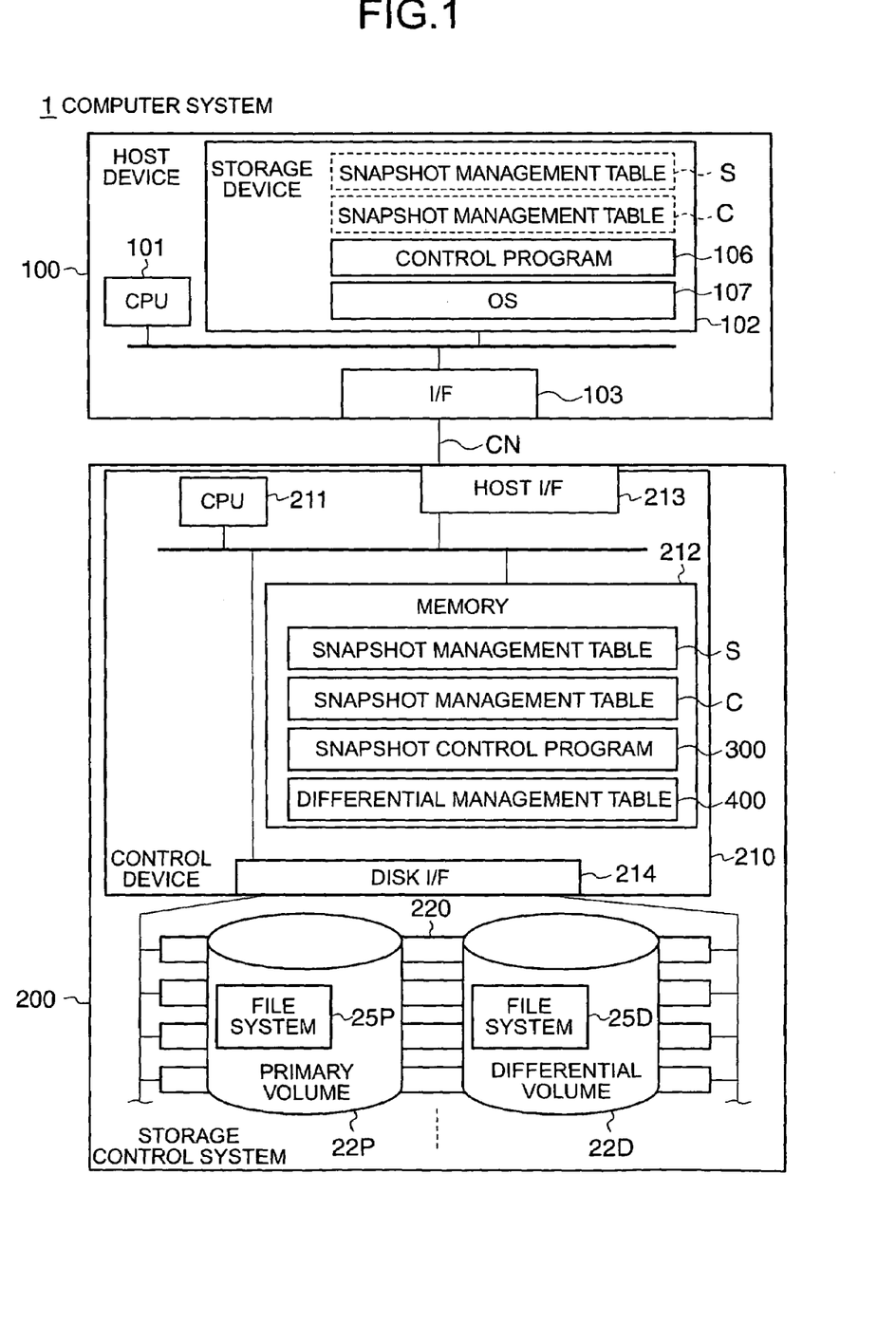
FIG. 1 shows the overall configuration of the computer system of one aspect of the invention.

FIG. 1 shows an example of the configuration of the computer system of one aspect of the invention.

This computer system 1 comprises a host device 100 and a storage control system 200 connected to the host device 100 via a communication network CN. For convenience, only one host device 100 and one storage control system 200 are shown, but the computer system may comprise a plurality of either or both rather than only one.

The host device 100 is a computer device comprising, for example, a CPU (Central Processing Unit) 101, storage device (for example, memory or a hard disk) 102, interface device ("I/F" in the drawings) 103 connected to the communication network CN, and other information processing resources, and may for example be configured as a personal computer, workstation, mainframe, or similar. The storage device 102 stores a control program 106 which executes prescribed control, and an operating system (hereafter "OS") 107; by reading the control program 106 and OS 107, the CPU 101 can execute control related to snapshots. Specifically, at the time of snapshot acquisition and at the time of superfluous differential management discarding, the control program 106 read into the CPU 101 creates a snapshot management table, described below, registers the table with the storage device 102, and transmits these to the storage control system 200 via the I/F 103. Below, the snapshot management table at the time of snapshot acquisition is called the "snapshot management table S", and the snapshot management table at the time of superfluous differential management discarding is called the "snapshot management table C". As the above OS 107, Windows (a registered trademark) or Linux (a registered trademark), or similar can be adopted. The superfluous differential management discarding time refers, for example, to the current time at which processing for superfluous differential management discarding, described below, is to be performed.

The communication network CN may be any type of communication network; for example, a LAN or SAN can be adopted.

The storage control system 200 comprises a plurality of physical storage devices 220 and a control device 210 which controls data writing to and reading from the storage devices 220.

The plurality of storage devices 220 comprise a plurality of logical devices (hereafter called "logical volumes"). The plurality of logical volumes are primary volumes 22P which are first storage volumes used by the host device 100 to store data, and differential volumes (secondary volumes) 23D which are second storage volumes used to store differential update data after a snapshot is acquired. The primary volumes 22P and secondary volumes 23D are mutually associated, and information relating to this association is managed for example in the memory 212 of the control device 210 (for example, the volume IDs of primary volumes 22P and the volume IDs of differential volumes 23D are mutually associated in memory 212). A file system 25P to manage data in a primary volume 22P is stored in the primary volume 22P. Similarly in differential volumes 22D also, a file system 25D is stored for management of data in the differential volume 22D.

The control device 210 comprises a host interface device (in the drawing, "host I/F") 213 connected to the host device 100 via the communication network CN, a disk interface device (in the drawing, "disk I/F") 214 connected to a plurality of storage devices 220 and which performs data writing and reading, memory 212, and a CPU 211 which executes control of the storage control system 200. In the memory 212 are stored information such as, for example, a snapshot control program 300 which is a computer program to control snapshots, a differential management table 400, and snapshot management tables S and C received from the host device 100. The snapshot management tables S and C can also be held by the host device 100, and moreover, snapshot management tables can be created at a plurality of times elapsed after snapshot acquisition, rather than only at the time of snapshot acquisition and at the time of superfluous differential management discarding.

The above summarizes the computer system 1. In this computer system 1, for example, the memory 212 may be removable from the equipment; or, a hard disk or other type of storage device may be used in place of memory. At least one among the CPUs 101 and 211 may comprise one or a plurality of CPUs.

Figure 2A:
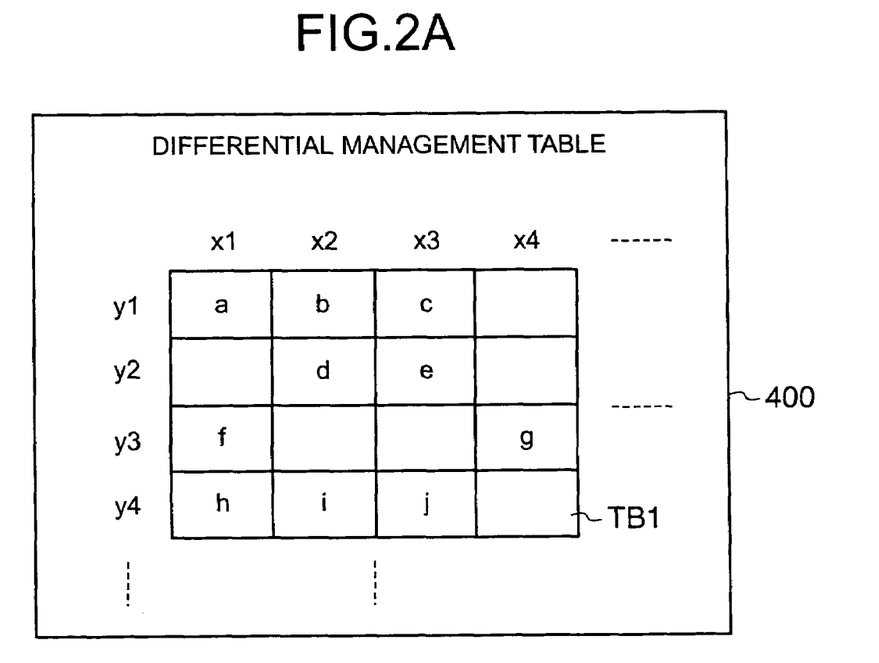
FIG. 2A shows an example of the configuration of a differential management table 400.

FIG. 2A shows an example of the configuration of a differential management table 400.

In this aspect, the storage control system 200 divides data storage areas of logical volumes (at least the primary volumes 22P) into storage blocks of a prescribed data size (for example, 512 bytes) and manages the storage blocks. The storage blocks may be LBAs (Logical Block Addresses) of logical volumes themselves, or may combine a number of LBAs.

The differential management table 400 shown in FIG. 2A has table blocks TB1 for all storage blocks of the primary volumes 22P, and in unique correspondence therewith. Each table block TB1 is expressed as a combination of a horizontal row x and vertical column y in FIG. 2A, represented for example as (x2:y4). Data recorded in a table block TB1 (for example, data i written to (x2:y4)) indicates the position coordinates (position coordinates in a differential volume 22D) indicating in which storage block of the differential volume 22D differential data is stored after snapshot acquisition of a certain storage block on the primary volume 22P. In the differential management table 400, table blocks TB1 in which data does not exist (for example, (x4:y1)) indicate that differential data for the storage block of the primary volume 22P corresponding to the table block TB1 does not exist in the differential volume 22D.

In snapshot management in this aspect, backup or restore operations are realized through use of the above-described differential management table 400 by the snapshot control program 300. Below, a specific example of this is explained.

For example, when after snapshot acquisition a write request is received from the host device 100 (in other words, when a data update occurs in the host device 100), the snapshot control program 300 read into the CPU 211 creates differential data corresponding to the data stored in the primary volume 22P, and writes this differential data to the differential volume 22D. At this time, the snapshot control program 300 records, in the table block TB1 (for example, (x3:y2)) of the differential management table 400 corresponding to the storage block of the primary volume 22P in which data corresponding to the differential data is stored, the position coordinates of the storage block in the differential volume 22D which becomes the write destination for the differential data. Here, in subsequent updates of the differential data corresponding to a storage block on a primary volume 22P which has undergone differential management, the position coordinates of the previously used differential volume 22D are used, and moreover position coordinates recorded in different table blocks TB1 of the differential management table 400 (position coordinates of storage blocks on the differential volume 23D) are controlled by the snapshot control program 300 so as to avoid overlap.

In this aspect, at least one among the following two types of data can be adopted as differential data. As the first type of differential data, when for example new data (hereafter "update data") from the host device 100 is written to a certain storage block on a primary volume 22P, the first type of differential data is the original data written to the storage block. As the second type of differential data, when update data is written to a certain storage block on a differential volume 22D, the second type of differential data is the update data itself. That is, when the first type of differential data is adopted, update data from the host device 100 is stored in the primary volume 22P, but when the second type of differential data is adopted, the update data is not stored in the primary volume 22P, but is stored in the differential volume 22D.

In snapshot cancellation (in other words, discarding of differential management information), the snapshot control program 300 discards the position coordinates in all the table blocks TB1 of the differential management table 400 (or, in addition, deletes all the data in the differential volume 22D). By this means, differential management can again be executed beginning from a state of no differential data, from the time of the next snapshot acquisition.

Next, the relation between the above snapshot management processing and backup processing or restore processing is explained.

After snapshot acquisition, when the control device 210 receives a read request from the host device 100, if update data has been written to the primary volume 22P in the above differential management method (that is, if the first type of differential data has been adopted), the data of the read request from the host device 100 is read from the primary volume 22P and returned to the host device 100.

On the other hand, when the control device 210 receives a read request from the host device 100, and if in the above differential management method update data has been written to the differential volume 22D (that is, if the second type of differential data has been adopted), the following processing is performed. The control device 210 checks the table block TB1 in the differential management table 400 corresponding to the storage block of the primary volume 22P of the read request from the host device 100, and if position coordinates for the differential volume 22D are recorded, reads the data from the storage block of the differential volume 22D indicated by the position coordinates, and returns the data to the host device 100. If however position coordinates for the differential volume 22D are not recorded in the above corresponding table block TB1, the control device 210 reads the data from the storage block of the primary volume 22P of the above read request, and returns the data to the host device 100.

In this way, after snapshot acquisition also, the host device 100 can read the most recent update data from the storage control system 200 (specifically, from either the primary volume 22P or from the differential volume 22D).

However, through differential management after the time of snapshot acquisition, original data which has not been updated by update data (for example, original data at the time of snapshot acquisition) is held by the storage control system 200 as a backup. This original data can be restored by for example modifying the method of responding to read requests from a host device 100 and by discarding update data. Below, an example is explained of a case in which the above original data is restored by discarding update data.

For example, in the differential management method in which update data is stored in a differential volume 22D, the snapshot management program 300 can, as restore processing, read original data (data at a specified time after the time of snapshot acquisition) as a backup from the primary volume 22P by resetting (discarding) all position coordinates recorded in the differential management table 400.

Further, in for example a differential management method in which update data is written to a storage block in a primary volume 22P, and the original data which had been stored in the storage block is stored in a differential volume 22D, as restore processing the snapshot management program 300 copies all the original data in the differential volume 22D identified from the differential management table 400 to the primary volume 22P, and by this means restores the original data after the time of snapshot acquisition to the primary volume 22P. Thereafter, by discarding all the position coordinates recorded in the differential management table 400, the snapshot management program 300 can read original data from the primary volume 22P as backup data.

The above summarizes snapshot management in this aspect. According to this explanation of snapshot management, management of differential data is performed only within the storage control system 200, so that the host device 100 cannot distinguish data which has become unnecessary. Consequently storage resources are expended on unnecessary data, and when restore processing is performed, in some cases excessive time may be required for processing.

Below, the manner in which data which has become unnecessary to the host device 100 arises is explained, based on a description of the data management method of the host device 100. The data management performed by the host device 100 may rely on the database or other application, or on the file systems 25P and 25D managed by the OS 107; below, an example in which the file systems 25P, 25D are used is explained.

Figure 2B:
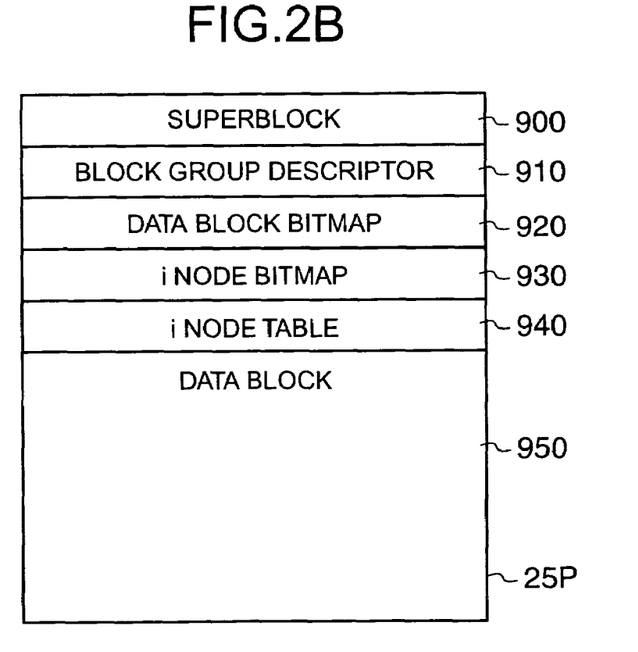
FIG. 2B shows an example of the configuration of the file system of the aspect.

FIG. 2B shows an example of the configuration of the file system of the aspect. The configuration of the file systems 25P and 25D are substantially the same, and so 25P is used as a representative example in the explanation.

By recording a file system 25P with a structure such as that of FIG. 2B in the primary volume 22P, the OS 107 of the host device 100 can manage data in the primary volume 22P. The file system 25P comprises, for example, a superblock 900, block group descriptor 910, data block bitmap 920, i node bitmap 930, i node table 940, and data block 950. Information relating to the file system 25P is recorded in the superblock 900, block group descriptor 910 and elsewhere, and a related series of data, that is, file information, is recorded in the i node table 940. And, the specific file data is recorded in the data block 950. Single i node information items in the i node table 930 correspond to individual files, and position information in the data block 950 of the actual data of a file is recorded in the i node. The data block 950 has a fixed size for storage of actual data of a file, and comprises, for example, blocks divided into units which are collections of a number of sizes of the LBAs of the logical volume. In the data block bitmap 920 is recorded information on the use of the block, as a bitmap corresponding to the block.

When the OS 107 of the host device 100 records data in the file system 25P, one of the i nodes in the i node table 940 is allocated as a file, and attributes relating to the file (for example the file name) are recorded in the i node; free blocks in the data block 950 are identified from the data block bitmap 920, and data is recorded in the a free block thus identified. The OS 107 records the position information for the free block in the i node, and at the time of data updating the recorded position of data is computed from information recorded in the i node, to execute data updating.

When the OS 107 deletes the file itself (or a portion of the file), the information of the i node itself is deleted (or, the position information recorded in the i node corresponding to the deleted data is deleted), and moreover, the information in the data block bitmap 920 corresponding to the block in the data block 950 which has become free through this processing is changed to unused (free).

Through the above processing by the OS 107, data at free positions in the data block 950 is put into an unused state until written with data again, so that any data can be written to such positions.

In the above-described snapshot management, when data is recorded in free areas of the data block 950 through file updates at the host device 100 after the time of snapshot acquisition, the storage control system 200 stores differential data for the data in a differential volume 22D.

Figure 3A:
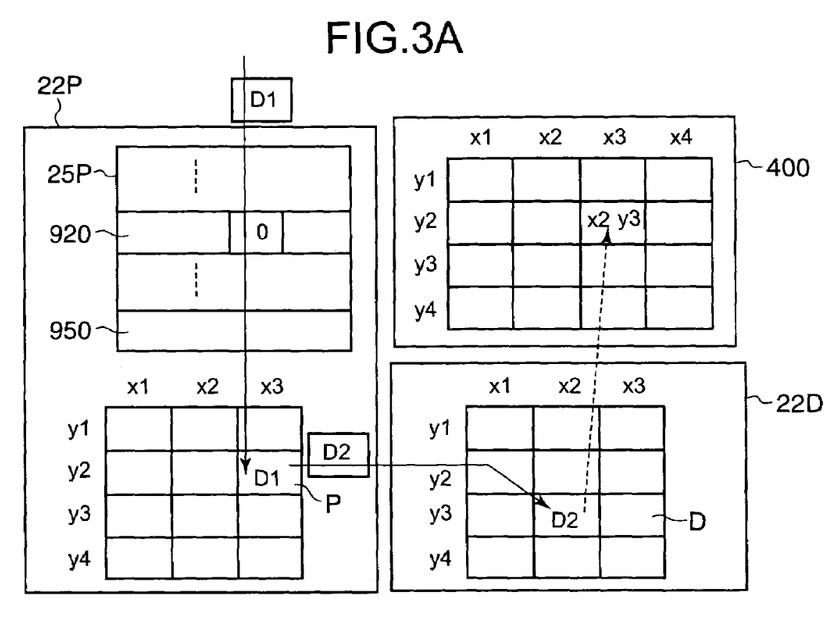
FIG. 3A shows an example in which data unnecessary for the host device 100 occurs, when original data prior to updating is written to a differential volume 22D.

FIG. 3A shows an example in which data unnecessary for the host device 100 occurs, when original data prior to updating is written to a differential volume 22D.

As shown in FIG. 3A, in snapshot management processing to write update data D1 to a storage block P in a primary volume 22P, the data D2 of a free area prior to update is written to a storage block D of the differential volume 22D as differential data. And the snapshot control program 300 writes the storage block position coordinates (for example, (x2:y3)) in the differential volume 22D which are the write destination of the differential data D2 to the table block TB1 (for example, (x3:y2)) of the differential management table 400 corresponding to the free area (for example, x3:y2)). Also, the snapshot control program 300 writes the update data D1 to the above free storage block in the primary volume 22P. As a result, the bitmap corresponding to the free area in the data block bitmap 920 is modified from the free state (for example, "0") to the used state (for example, "1") by the OS 107.

In the snapshot management processing of FIG. 3A, the differential data D2 stored in the differential volume 22D is data in a free area of the data block 950 in the file system 25P, and so in actuality is not restored in restore processing. And, each time new update data D1 is written to the same storage block P in the primary volume 22P, the data D2 prior to the update either overwrites old data D2 prior to the update and stored in a certain storage block D of the differential volume 22D, or may instead be stored in a separate storage block D without overwriting other data. In the latter case, this processing is accompanied by preparation of a new differential management table 400, and differential management may be performed each time data is updated.

Figure 3B:
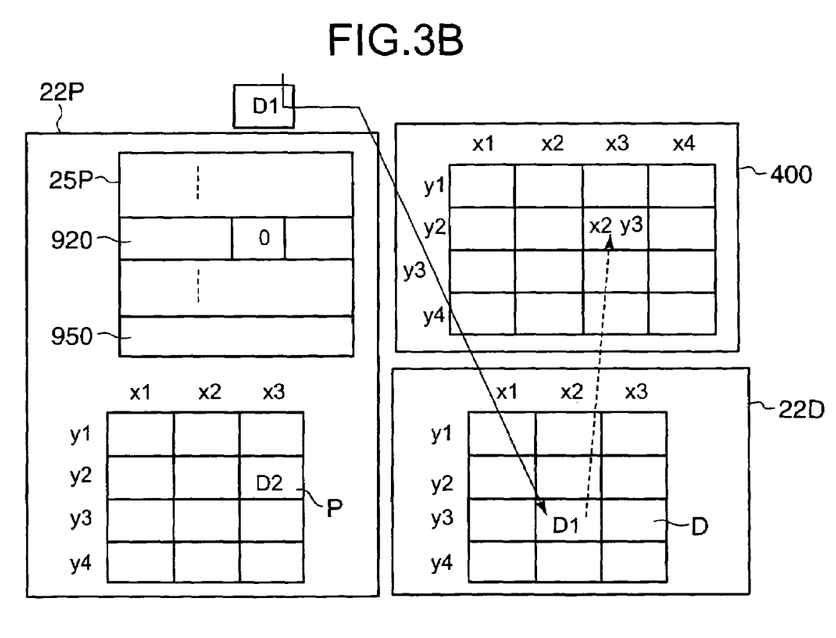
FIG. 3B shows an example in which data unnecessary for the host device 100 occurs, when update data is written to a differential volume 22D.

FIG. 3B shows an example in which data unnecessary for the host device 100 occurs, when update data is written to a differential volume 22D.

As shown in FIG. 3B, in snapshot management processing to write update data D1 to a differential volume 22D, the data D2 of the free area continues to be held in the primary volume 22P. On the other hand, the update data D1 corresponding to this data D2 is written to a certain storage block (for example, a storage block in a free state) of the differential volume 22D by the snapshot control program 300. Here, the snapshot control program 300 writes the storage block position coordinates (for example, (x2:y3)) in the differential volume 22D, which are the write destination of the differential data D1, to the table block TB1 (for example, (x3:y2)) in the differential management table 400 corresponding to free area (free area on the primary volume 22P, for example x3:y2) having the data D2 corresponding to the update data D1.

When the snapshot management processing shown in FIG. 3B is performed, in restore processing the data D2 of the free area is not read. And in normal read processing by the host device 100 other than restore processing, the update data D1 is read, so that the data D2 of the free area is not necessary.

As described above, in snapshot management processing, differential management of data in free areas of the data block 950 in the file system 25P is management of superfluous differential data.

Figure 4A:
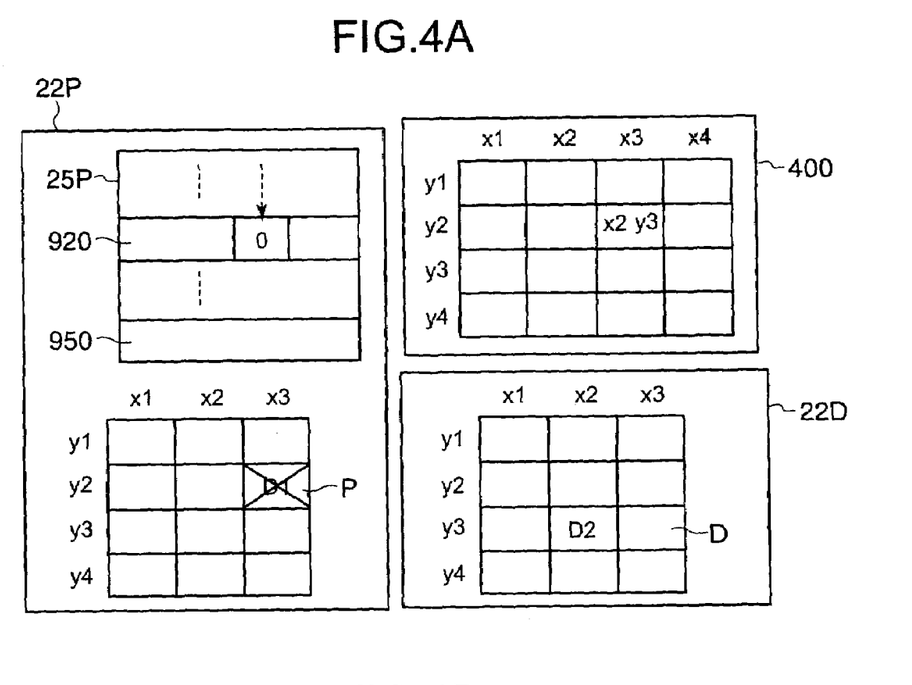
FIG. 4A shows another example in which data unnecessary for the host device 100 occurs, when original data prior to updating is written to a differential volume 22D.

FIG. 4A shows another example in which data unnecessary for the host device 100 occurs, when original data prior to updating is written to a differential volume 22D. Specifically, FIG. 4A shows an example in which in this case, at the time of snapshot acquisition, a certain area in the data block 950 of the file system 25P is in use, and after snapshot acquisition a storage block of the primary volume 22P (hereafter a "primary storage block") which had been subjected to differential management thereafter becomes free due to file updating (for example, deletion).

When original data prior to updating is written to the differential volume 22D, the update data D1 is written to the primary volume 22P. Thereafter, as shown in FIG. 4A, when for example the OS 107 of the host device 100 deletes update data D1 from a primary storage block, the area of the data block 950 corresponding to the primary storage block is made a free area, and the bitmap corresponding to this free area is changed from the used state to the free state. As a result, during subsequent normal operation (for example, when a restore is not in progress), the OS 107 of the host device 100 does not read data from the primary storage block which has become free. Consequently even if the position coordinates in the differential volume 22D (hereafter "differential position coordinates") corresponding to the primary storage block which has become free are managed in the differential management table 400, in normal operation the OS 107 does not read the original data prior to update D2 from the storage block in the differential volume 22D (hereafter the "differential storage block") corresponding to the differential position coordinates.

Figure 4B:
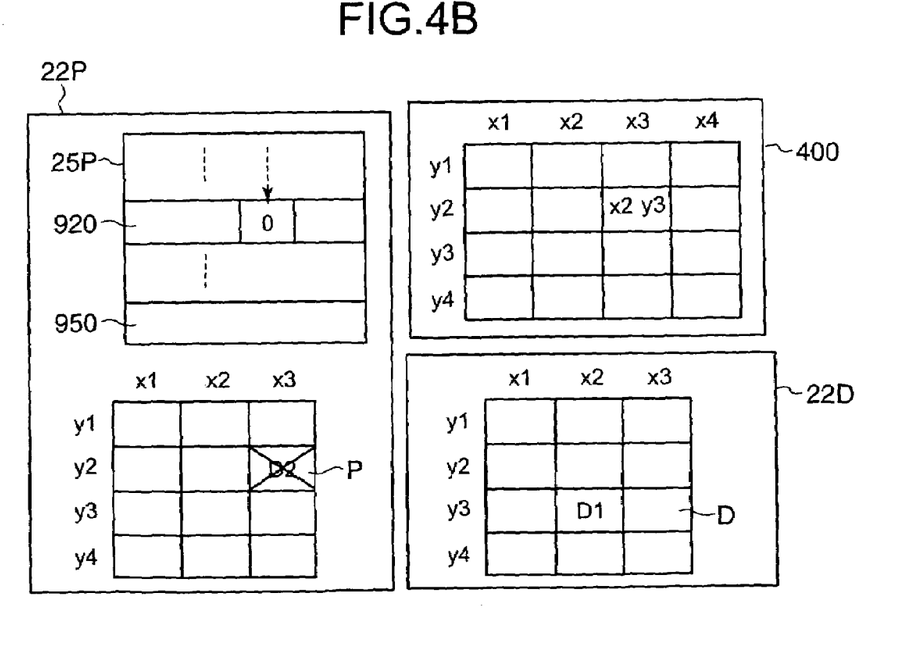
FIG. 4B shows another example in which data unnecessary for the host device 100 occurs, when update data is written to a differential volume 22D.

FIG. 4B shows another example in which data unnecessary for the host device 100 occurs, when update data is written to a differential volume 22D. Specifically, FIG. 4B shows an example of a case in which, at the time of snapshot acquisition, an area in the data block 950 of the file system 25P is in use, and moreover after the snapshot acquisition the storage block (storage block of the primary volume 22P) which had been subjected to differential management becomes free through a subsequent file update (for example, deletion).

As shown in FIG. 4B, when for example the OS 107 of the host device 100 deletes original data prior to updating D2 from a primary volume 22P, the area of the data block 950 corresponding to the storage block of the original data D2 is made a free area, and the bitmap corresponding to this free area is changed from the used state to the free state. As a result, in subsequent normal operation (for example, when a restore is not in progress), the OS 107 of the host device 100 does not read data from the primary storage block corresponding to the free area. Hence even if the differential position coordinates relating to the primary storage block which has become free are being managed in the differential management table 400, in normal operation the OS 107 does not read update data D1 corresponding to deleted original data D2 from the differential storage block corresponding to the differential position coordinates. Further, when there is a read request from the host device 100 during a restore operation, the original data prior to update D2 is read, so that again the update data D1 is not necessary.

As described above, even when at the time of snapshot acquisition a certain area in the data block 950 of the file system 25P is in use, if subsequently this area becomes a free area, differential management in the differential management table 400 of the primary storage block corresponding to this free area is ineffective.

Hence in this aspect, the snapshot management table described in detail below is prepared, and by using this snapshot management table in the processing explained below, the above-described ineffective differential management can be resolved. Details of this mechanism are explained below.

Figure 5:
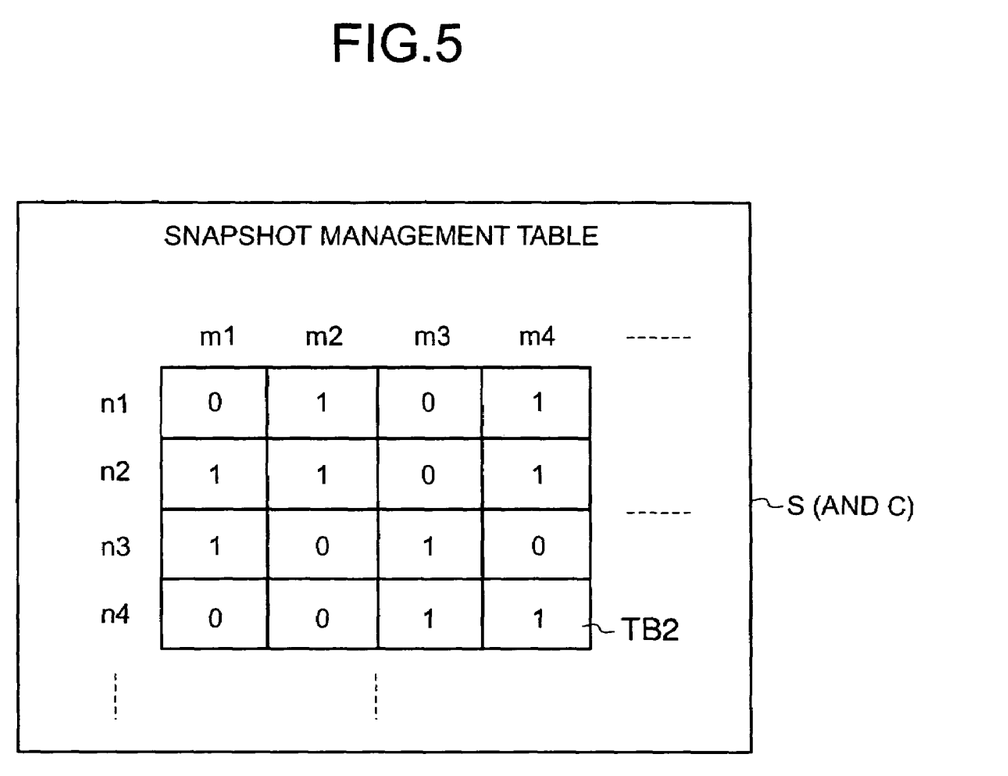
FIG. 5 shows an example of the configuration of a snapshot management table.

FIG. 5 shows an example of the configuration of a snapshot management table. Both the snapshot management table S at the time of snapshot acquisition and the snapshot management table C at the time of superfluous differential management discarding have similar configuration, and so the snapshot management table S at the time of snapshot acquisition is used as a representative example in the explanation.

The snapshot management table S comprises cells TB2 expressed as a horizontal row m and vertical column n. In this aspect, each cell TB2 is for example uniquely associated with a component element of a data block bitmap 920 of the file system 25P. From the relations between a data block 950 and data block bitmap 920 in this file system 25P, each of the cells TB2 of a snapshot management table S is indirectly but uniquely associated with each of the data items of the data block 950. A detailed explanation is omitted, but a method is also conceivable which forms associations such that there is no overlap between component elements of a plurality of data block bitmaps 920 and one cell TB2 of a snapshot management table S.

The information recorded in each cell TB2 of the snapshot management table S, such as for example an "0" recorded in the cell with coordinates m1:n1, or a "1" recorded in the cell with coordinates m2:n1, expresses the data block bitmap 920 of the file system 25P and the presence or absence of data in the corresponding data block 950. Specifically, for example, "0" is recorded in a cell (for example, the cell with coordinates m1:n1) corresponding to a free area of the data block 950, and "1" is recorded in a cell (for example, the cell with coordinates m2:n1) corresponding to a used area of the data block 950.

In this aspect, each of the table-blocks TB1 of the differential management table 400, and each of the cells TB2 of the snapshot management table S, is in a one-to-one correspondence with blocks of the data block 950 in the file system 25P. A detailed explanation of cases other than this aspect is omitted, but by for example registering in a differential volume 22D a plurality of differential data items for the data in the same primary storage block, when a plurality of differential management tables 400 are generated, a method is also conceivable in which, in each of the blocks of the data block 950, table blocks TB1 of the plurality of differential management tables 400 and a cell TB2 in one snapshot management table S are associated without overlap.

Below, processing performed in this aspect is explained.

Figure 6A:
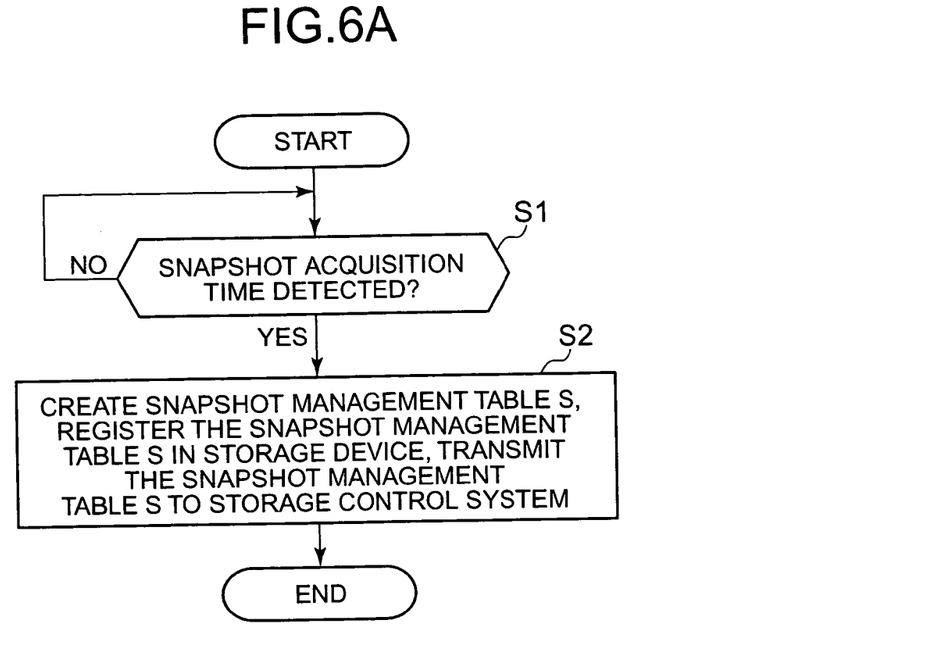
FIG. 6A shows the flow of processing when the host device 100 creates a snapshot management table S at the time of acquisition of a snapshot.

FIG. 6A shows the flow of processing when the host device 100 creates a snapshot management table S at the time of acquisition of a snapshot.

When the control program 106 of the host device 100 detects snapshot acquisition (YES in step S1), a snapshot management table S for that time is created and registered in the storage device 102, based on information (for example, the data block bitmap 920 and data block 950) recorded in the file system 25P at that time, and the snapshot management table S is transmitted to the storage control system 200 (S2). The control program 106 can for example detect the occurrence of any of the following (A) to (C) as snapshot acquisition:

(A) Detection of prescribed timing (for example, a time), set by the user or by other means, through use of a timer, not shown, in the host device 100;

(B) Reception of a first prescribed signal (for example, a snapshot acquisition command) from the storage control system 200; and, (C) Reception of a snapshot acquisition command from a user via an input device, not shown, of the host device 100.

After the start of differential management (for example, after the time of acquisition of the first snapshot), each time acquisition of a new snapshot is detected, the control program 106 may execute the processing of the above-described S2. Also, when as described above a snapshot management table S is created based on the file system 25P at the time of snapshot acquisition, when for example update data D1 is written to a free storage block of the primary volume 22P as shown in FIG. 3A, an "0" indicating the free state is written in the cell Tb2 of the snapshot management table S corresponding to the storage block. That is, at for example the time of snapshot acquisition, when update data D1 is written to a free storage block of the primary volume 22P, before the free area corresponding to the free storage block (the free area in the data block 950 of the file system 25P) changes from the free state to the used state, the snapshot management table S is created based on the file system 25P.

Figure 6B:
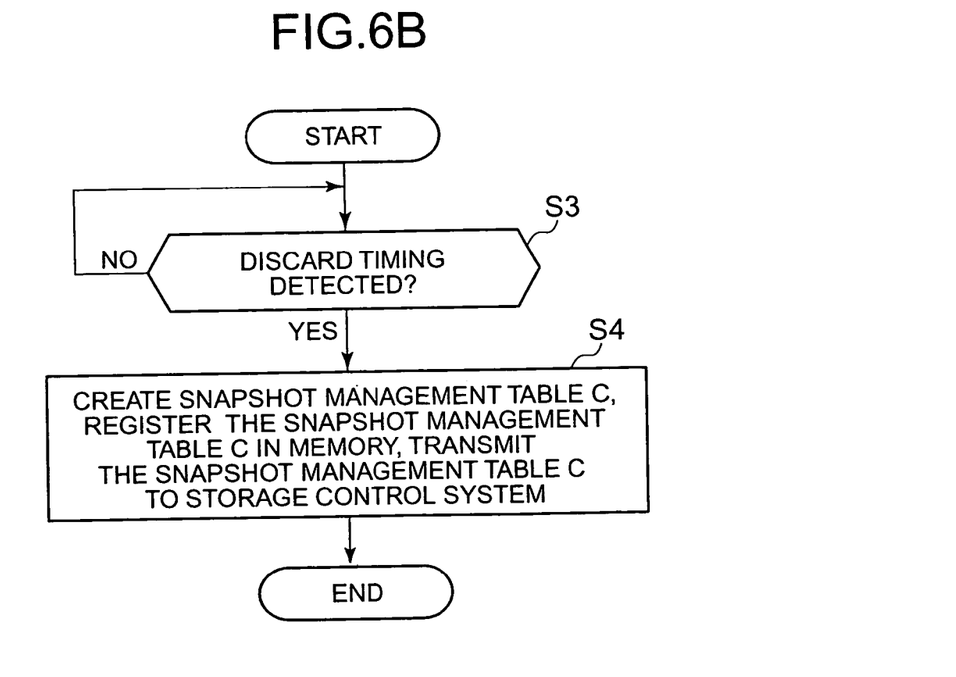
FIG. 6B shows the flow of processing when the host device 100 creates a snapshot management table C at the time of superfluous differential management discarding; and, FIG. 7 shows the flow of processing when the control device 210 of the storage control system 200 performs superfluous differential management discarding.

FIG. 6B shows the flow of processing when the host device 100 creates a snapshot management table C at the time of superfluous differential management discarding.

When, during a period in which differential management is being performed, the control program 106 of the host device 100 detects superfluous differential management discarding (YES in S3), a snapshot management table C for that time is created and registered in the storage device 102, based on information (for example, the data block bitmap 920 and data block 950) recorded in the file-system 25P at that time, and this snapshot management table C is transmitted to the storage control system 200 (S4). The control program 106 can for example detect the occurrence of any of the following (A) through (D) as superfluous differential management discarding:

(A) Detection of prescribed timing (for example, a time), set by the user or by other means, through use of a timer, not shown, in the host device 100;

(B) Reception of a second prescribed signal (for example, a superfluous differential management discard command) from the storage control system 200;

(C) Reception of a superfluous differential management discard command from a user via an input device, not shown, of the host device 100; and, (D) Issuance of a read request or write request from the host device 100.

"Superfluous differential management discarding" means that if superfluous differential management is being performed, this management operation is discarded; specifically, if for example ineffective differential position coordinates are recorded in the differential management table 400, these are discarded. That is, superfluous differential management discarding differs in meaning from differential position coordinate discarding performed in restore processing, that is, differs from the discarding of all differential position coordinates recorded in the differential management table 400.

Figure 7:
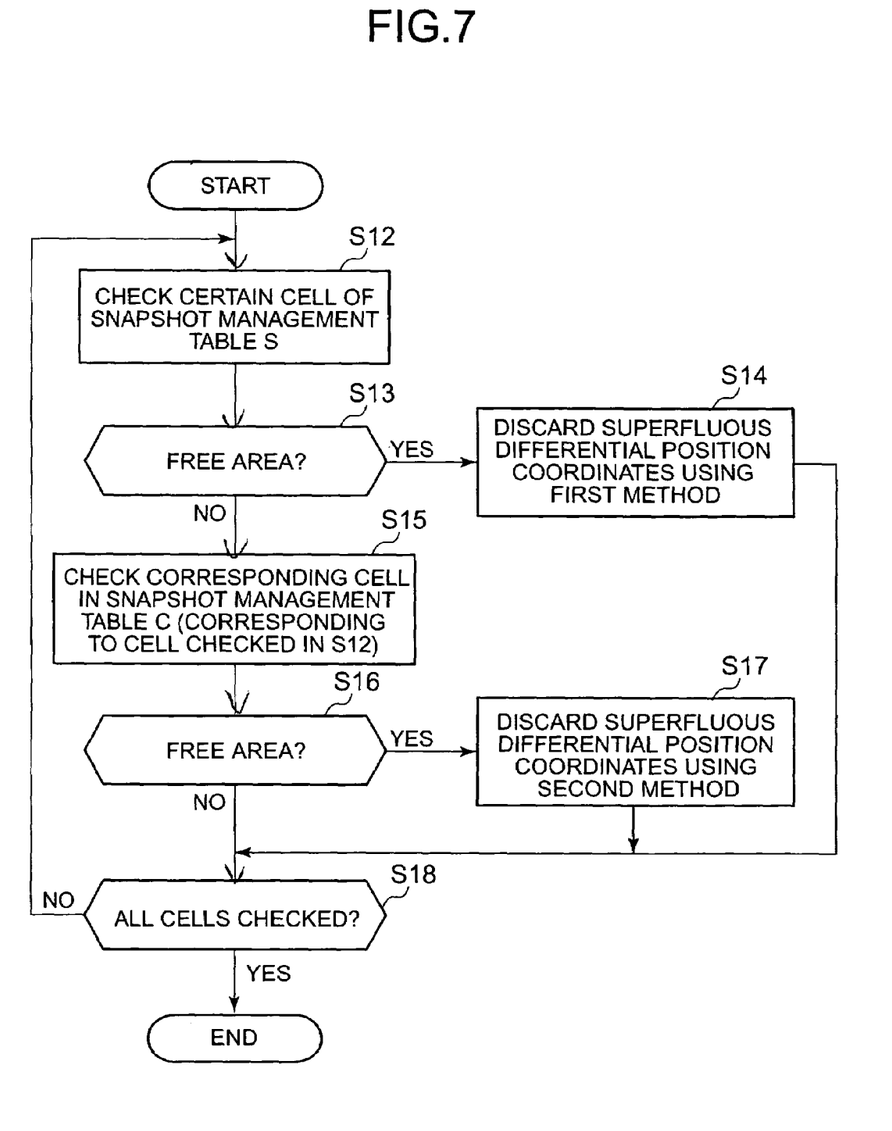

FIG. 7 shows the flow of processing when the control device 210 of the storage control system 200 performs superfluous differential management discarding.

Snapshot management tables S and C transmitted from the host device 100 are registered in the memory 212 of the control device 210 by the CPU 211 of the control device 210. Also, when at least among the following (A) through (C) occurs, the snapshot control program 300 read by the CPU 211 can begin the processing of S12 below.

(A) When a superfluous differential management discard command, commanding the discarding of differential position coordinates under unnecessary differential management, is received from the host device 100 or from another information processing terminal, not shown (B) When a prescribed time is detected by a timer or other means not shown, comprised by the storage control system 200

(C) When a snapshot management table C having table attributes indicating a snapshot management table for a time of superfluous differential management discarding (a table C having such attributes may also be created by the control program 106 of the host device 100) is received, and the above table attributes are detected on the table C First, the snapshot control program 300 selects one cell TB2 from among the plurality of cells TB2 in the snapshot management table S, and checks whether the information recorded in the cell TB2 is "1" or "0", that is, whether the area corresponding to the cell TB2 (the area of the data block 950 of the file system 25P at the time of snapshot acquisition) is in use or free (S12).

If as the result of S12 the area is distinguished as being free (YES in S13), in a first method the snapshot control program 300 discards superfluous differential position coordinates (S14). Specifically, when for example update data is stored in the primary volume 22P, the snapshot control program 300 specifies the table block TB1 of the differential management table 400 corresponding to the above free area (that is, the free primary storage block), and if differential position coordinates are recorded in this table block TB1, erases the differential position coordinates (and in addition, may also erase data existing at the location indicated by the differential position coordinates). Or, when for example update data is stored in the differential volume 22D, the snapshot control program 300 specifies a table block TB1 of the differential management table 400 corresponding to a free primary storage block, and if differential position coordinates are recorded in the table block TB1, copies the update data existing in the storage block indicated by the differential position coordinates to the corresponding free primary storage block, and thereafter deletes the differential position coordinates from the differential management table 400. Through the above processing of S14, the unnecessary data D2 explained referring to FIG. 4A and FIG. 4B, that is, unnecessary data D2 which is not read by the host device 100 because it had been a free area in the data block 950 of the file system 25P at the time of snapshot acquisition, is discarded.

If as the result of S12 the area is distinguished to be in use (NO in S13), the snapshot control program 300 selects the cell TB2 corresponding to the cell selected in the above S12 from among the plurality of cells TB2 in the snapshot management table C created at the time of superfluous differential management discarding, and checks whether the information recorded in this cell TB2 is "1" or "0", that is, whether the area corresponding to the cell TB2 (the area of the data block 950 of the file system 25P at the time of superfluous differential management discarding) is in use or is free (S15).

If as the result of S15 the area is distinguished to be free (YES in S16), the snapshot control program 300, in the second method, discards superfluous differential coordinates (S17). Specifically, when for example update data is stored in the primary volume 22P, the snapshot control program 300 specifies the table block TB1 of the differential management table 400 corresponding to a free primary storage block, and if differential position coordinates are recorded in this table block TB1, copies the original data prior to update D2 existing in the storage block indicated by these differential position coordinates to the corresponding free primary storage block, after which the differential position coordinates are deleted from the differential management table 400. Or, when update data is stored in the differential volume 200D, the snapshot control program 300 specifies the table block TB1 in the differential management table 400 corresponding to a free primary storage block, and if differential position coordinates are recorded in this table block TB1, erases the differential position coordinates (and in addition, may also erase the update data D1 existing at the location indicated by the differential position coordinates). Even if unnecessary data D1 as explained using FIG. 5A and FIG. 5B exists as a result of the processing of the above S17, that is, even if data exists at the time of snapshot acquisition, through subsequent file updating (for example, deletion), the area is made free as a result of superfluous differential management discarding, and unread update data D1 in the data block 950 of the file system 25P at this time is discarded.

If as a result of S15 also the area is distinguished as being in use (NO in S16), then if the snapshot control program 300 has not performed the processing of S12 or S15 for all of the cells of the snapshot management tables S and C, processing returns to S12, and the above checks are performed for cells which have not yet been checked.

In the above processing, even at the time of snapshot acquisition or superfluous differential management discarding, for example, when data exists in the data block 950 of the file system 25P, or when at the time of superfluous differential management discarding there is a free area in the data block 950, if the data in the free area has not been updated even once, that is, if there exists no differential data corresponding to the free area, then processing to discard differential position coordinates need not be performed; in this case, the differential position coordinates may continue to exist in the differential management table 400, and a state in which the differential data itself does not exist may continue unchanged.

The processing flow shown in FIG. 6 is merely one example, and processing need not be limited to this flow. For example, after performing the processing of S12 through S14 for all the cells in the snapshot management table for the time of snapshot acquisition, the snapshot control program 300 may perform the processing of S15 through S17 for all the cells (or, for only cells corresponding to cells for which the result in S13 is NO) of the snapshot management table C for the time of superfluous differential management discarding. And in the above processing, when differential position coordinates recorded in the differential management table 400 are deleted, the snapshot control program 300 may also delete the data stored in the storage block indicated by the differential position coordinates.

In the above, preferred aspects of the invention have been explained; however, these are merely illustrations used to explain the invention, and the scope of the invention is not limited to these aspects. This invention can be implemented in various other modes as well. For example, at least one among the snapshot management tables S and C may be generated by the control device 210 based on information recorded in the file system 25P of the primary volume 22P, and registered in memory 212. Also, the storage control system 200 may be NAS (Network Attached Storage). And a portion of or the entirety of the processing shown in FIG. 7 may be executed by the host device 100 (for example, by the control program 106 thereof). Also, the snapshot control program 300 may cause to be stored in memory 212 an update history of differential position coordinates for each table block TB1 of the differential management table 400 (for example, differential position coordinates at each time of snapshot acquisition, and at the time of superfluous differential management discarding).

What is claimed is:

1. A storage control system, connected to an external device which performs data reading and writing, comprising:
a first storage device having a plurality of first storage areas;
a second storage device having a plurality of second storage areas; and,
a control device which controls the exchange of data between said external device and at least one among said first storage device and said second storage device; wherein
differential data which corresponds to at least one among said plurality of first storage areas is stored in at least one among said plurality of second storage areas, said differential data being data that is issued to be stored by said external device, and can be read out by said external device, and said control device:
acquires snapshot management information indicating from which first storage area data has not been read by said external device;
acquires differential management information indicating to which first storage area differential data corresponds and in which second storage area the data is stored;
identifies, based on said acquired snapshot management information and said acquired differential management information, in which second storage area differential data which is not read out by said external device is stored and to which first storage area among said plurality of first storage areas the second storage area corresponds; and
performs at least one among removal of the differential data stored in said identified second storage area from the second storage area, and removal of an information element indicating said specified second storage area in said differential management information from said differential management information;
wherein when said external device transmits data for writing to said storage control system, and moreover transmits data update requests or deletion requests to said storage control system, said control device:
upon receiving data for writing from said external device at a snapshot acquisition timing, selects a free second storage area from among said plurality of second storage areas, and writes first data in the first storage area which is to be the write destination of said data for writing to said selected free second storage area, and moreover writes said received data for writing to said first storage area which is the write destination;
writes, to said differential management information, an information element indicating which among said plurality of second storage areas is the second storage area to which said first data has been written and the second storage area corresponding to the first storage area in which said first data had been stored;
upon receiving a data update request or deletion request from said external device at a superfluous differential management discarding timing following said snapshot acquisition timing, responds to said received update request or deletion request, and erases the data which had been stored in said first storage area;
acquires said snapshot management information for a timing following said superfluous differential management timing, and from said acquired snapshot management information, identifies a free first storage area not storing data among said plurality of first storage areas; and,
if said acquired differential management information comprises an information element indicating the second storage area associated with said free first storage area, removes said comprised information element from said differential management information, and moreover removes data in the second storage area indicated by said comprised information element from said second storage area.

2. A storage control system, connected to an external device which performs data reading and writing, comprising:
a first storage device having a plurality of first storage areas;
a second storage device having a plurality of second storage areas; and,
a control device which controls the exchange of data between said external device and at least one among said first storage device and said second storage device; wherein
differential data which corresponds to at least one among said plurality of first storage areas is stored in at least one among said plurality of second storage areas, said differential data being data that is issued to be stored by said external device, and can be read out by said external device, and said control device:
acquires snapshot management information indicating from which first storage area data has not been read by said external device;
acquires differential management information indicating to which first storage area differential data corresponds and in which second storage area the data is stored;
identifies, based on said acquired snapshot management information and said acquired differential management information, in which second storage area differential data which is not read out by said external device is stored and to which first storage area among said plurality of first storage areas the second storage area corresponds; and
performs at least one among removal of the differential data stored in said identified second storage area from the second storage area, and removal of an information element indicating said specified second storage area in said differential management information from said differential management information;
wherein when said external device transmits data for writing to said storage control system, and moreover transmits data update requests or deletion requests to said storage control system, said control device:
upon receiving data for writing from said external device at a snapshot acquisition timing, selects a free second storage area from among said plurality of second storage areas, and writes said received data for writing to said selected free second storage area;
identifies in which first storage area, among said plurality of first storage areas, exists data corresponding to said data for writing, and writes, to said differential management information, an information element indicating the correspondence of the second storage area to which was written said data for writing with said identified first storage area;
upon receiving from said external device a data update request or deletion request at a superfluous differential management discarding timing following said snapshot acquisition timing, responds to said received update request or deletion request, and erases data stored in said first storage area;

acquires said snapshot management information for a timing following said superfluous differential management discarding timing, and from said acquired snapshot management information, identifies a free first storage area not storing data among said plurality of first storage areas; and, if said acquired differential management information comprises an information element indicating the second storage area associated with said free first storage area, removes said comprised information element from said differential management information, and moreover removes data for writing in the second storage area indicated by said comprised information element from said second storage area.

3. The storage control system according to claim 1, wherein said external device creates said snapshot management information based on a file system of said first storage device and transmits said created snapshot management information, wherein said control device acquires said snapshot management information by receiving said snapshot management information from said external device.

4. The storage control system according to claim 2, wherein said external device creates said snapshot management information based on a file system of said first storage device and transmits said created snapshot management information, wherein said control device acquires said snapshot management information by receiving said snapshot management information from said external device.

5. A storage control system, connected to an external device which performs data reading and writing, comprising:

a first storage device having a plurality of first storage areas;

a second storage device having a plurality of second storage areas; and, a control device which controls the exchange of data between said external device and at least one among said first storage device and said second storage device; wherein differential data which corresponds to at least one among said plurality of first storage areas is stored in at least one among said plurality of second storage areas, said differential data being data that is issued to be stored by said external device, and can be read out by said external device, and said control device:

acquires snapshot management information indicating from which first storage area data has not been read by said external device;

acquires differential management information indicating to which first storage area differential data corresponds and in which second storage area the data is stored;

identifies, based on said acquired snapshot management information and said acquired differential management information, in which second storage area differential data which is not read out by said external device is stored and to which first storage area among said plurality of first storage areas the second storage area corresponds; and performs at least one among removal of the differential data stored in said identified second storage area from the second storage area, and removal of an information element indicating said specified second storage area in said differential management information from said differential management information;

wherein said external device creates said snapshot management information based on a file system of said first storage device and transmits said created snapshot management information, wherein said control device acquires said snapshot management information by receiving said snapshot management information from said external device.

* * * * *